(12) United States Patent
Tada

(10) Patent No.: US 7,194,191 B2
(45) Date of Patent: Mar. 20, 2007

(54) INFORMATION RECORDING AND REPRODUCING APPARATUS

(75) Inventor: Kenichiro Tada, Tokorozawa (JP)

(73) Assignee: Pioneer Corporation, Tokyo (JP)

(*) Notice: Subject to any disclaimer, the term of this patent is extended or adjusted under 35 U.S.C. 154(b) by 1220 days.

(21) Appl. No.: 10/000,809

(22) Filed: Dec. 4, 2001

(65) Prior Publication Data

US 2002/0081091 A1    Jun. 27, 2002

(30) Foreign Application Priority Data

Dec. 5, 2000    (JP)    ............................. 2000-369949

(51) Int. Cl.
*H04N 5/91*    (2006.01)

(52) U.S. Cl. ...................... 386/83; 386/125; 369/30.06

(58) Field of Classification Search .................... 386/4, 386/46, 52, 83, 95, 109, 112, 125, 126; 360/5; 369/30; 380/211; 711/3, 118, 133, 134, 711/136, 144, 154, 156–159; 348/22.1, 443, 348/423.1, 445; 725/58, 92, 94, 114–117, 725/137, 140

See application file for complete search history.

(56) References Cited

U.S. PATENT DOCUMENTS 6,678,463 B1 *    1/2004    Pierre et al. .................. 386/83

FOREIGN PATENT DOCUMENTS

JP    02253462 A    * 10/1990
JP    2000-330761    11/2000

* cited by examiner

*Primary Examiner*—Thai Q. Tran
*Assistant Examiner*—Mishawn Dunn
(74) *Attorney, Agent, or Firm*—Drinker Biddle & Reath LLP

(57) ABSTRACT

An information recording and reproducing apparatus with a ring buffer which can expand a ring buffer area on a recording medium. In response to the extension command operation, an extension start point is obtained based on a current recording position in the ring buffer area, an empty area on the recording medium is set as an extended area in the ring buffer area, and the extended area is set as a target of recording and reproduction next to an area which ends at a position just before the extension start point.

7 Claims, 6 Drawing Sheets

FIG. 3A

| | RING BUFFER AREA | | |
|---|---|---|---|
| | DIVIDED AREA | EXTENT LOCATION | EXTENT LENGTH |
| 1ST AD | B1 | S | r |
| 2ND AD | B2 | U | k |
| 3RD AD | B3 | R | t |
| 4TH AD | | | |
| 5TH AD | | | |

FIG. 3B

| | RING BUFFER AREA | | |
|---|---|---|---|
| | DIVIDED AREA | EXTENT LOCATION | EXTENT LENGTH |
| 1ST AD | B1 | S | r |
| 2ND AD | B2a | U | DP - U |
| 3RD AD | B4 | P | w |
| 4TH AD | B2b | DP | k - ( DP - U ) |
| 5TH AD | B3 | R | t |

3RD AD and 4TH AD rows: EXTENDED AREA

FIG. 4A

|  | | EMPTY AREA | |
|---|---|---|---|
|  | | EXTENT LOCATION | EXTENT LENGTH |
| 1ST AD | E1 | G | g |
| 2ND AD | E2 | P | w |
| 3RD AD | E3 | J | n |

FIG. 4B

|  | | EMPTY AREA | |
|---|---|---|---|
|  | | EXTENT LOCATION | EXTENT LENGTH |
| 1ST AD | E1 | G | g |
| 2ND AD | E3 | J | n |

INFORMATION RECORDING AND REPRODUCING APPARATUS

BACKGROUND OF THE INVENTION

1. Field of the Invention

The invention relates to an apparatus for continuously recording and reproducing an information signal carrying a video image, an audio sound, and the like to/from a predetermined area on a recording medium.

2. Description of Related Art

In recent years, hard disk recorders are attracting a great attention as a recording device in which a program provided by the television broadcast or the like is recorded onto a hard disk instead of a video tape. The use of a hard disk as a recording medium allows, for example, a simultaneous reproduction of a recorded program while each program of a desired channel which is broadcasted on that day is being continuously recorded. To realize such a continuous-recording and simultaneous reproduction, a ring buffer area is provided in the hard disk. In the hard disk recorder having such a configuration, the broadcast program received by a tuner is sequentially recorded from a head position of the ring buffer area. When the recording onto the last position of the ring buffer area is finished, a recording position returns to the head position of the ring buffer area and the recording is continued therefrom. That is, each of the broadcasted programs is sequentially recorded by using the ring buffer area on the hard disk circularly. If the user executes an operation to supply a reproducing command for a desired-recorded program during the period in which the above-described operation is taking place, the hard disk recorder reads out the desired program from the ring buffer area and reproduces it while executing the recording operation mentioned above.

Now, assuming that recording capacity of the ring buffer area is determined to be a capacity which allows recording of all of the broadcast programs in one day (24 hours) for example, it apparently follows that all of the programs which are broadcasted on that day can be recorded.

That is, so long as the program is a program broadcasted in the last 24 hours, the program can be reproduced at a later time. However, since information is recorded in the ring buffer area by using the area circularly as mentioned above, if broadcast programs of the next day are subsequently recorded, the broadcast programs of the next day are written from the head position of the ring buffer area so that the previously recorded contents are overwritten. That is, with the scheme described above, the programs broadcasted before the last 24 hours cannot be reproduced.

OBJECTS AND SUMMARY OF THE INVENTION

The invention has been made to solve the problems and it is an object of the invention to provide an information recording and reproducing apparatus which can expand a ring buffer area in a recording medium even during the continuous-recording and simultaneous reproduction operation.

According to the present invention, there is provided an information recording and reproducing apparatus having a recording and reproducing unit for recording and reproducing an information signal in and from a predetermined area on a recording medium, comprising: an operating unit for generating an extension command signal in accordance with an extension command operation; an extension start point obtaining unit for obtaining an extension start point based on a recording position in the predetermined area at an instant of generation of the extension command signal; and a recording and reproducing procedure setting part for setting a recording and reproducing procedure in the recording and reproducing part so as to set an empty area on the recording medium as an extended area and set the extended area to a target of recording and reproduction next to an area which ends at a position immediately before the extension start point.

BRIEF DESCRIPTION OF THE DRAWINGS

FIGS. 3A and 3B are diagrams showing examples of allocation descriptors regarding the ring buffer area;

FIGS. 4A and 4B are diagrams showing examples of allocation descriptors regarding the empty area;

DETAILED DESCRIPTION OF THE PREFERRED EMBODIMENT

An embodiment of the invention will be described hereinbelow with reference to the drawings.

Figure 1:
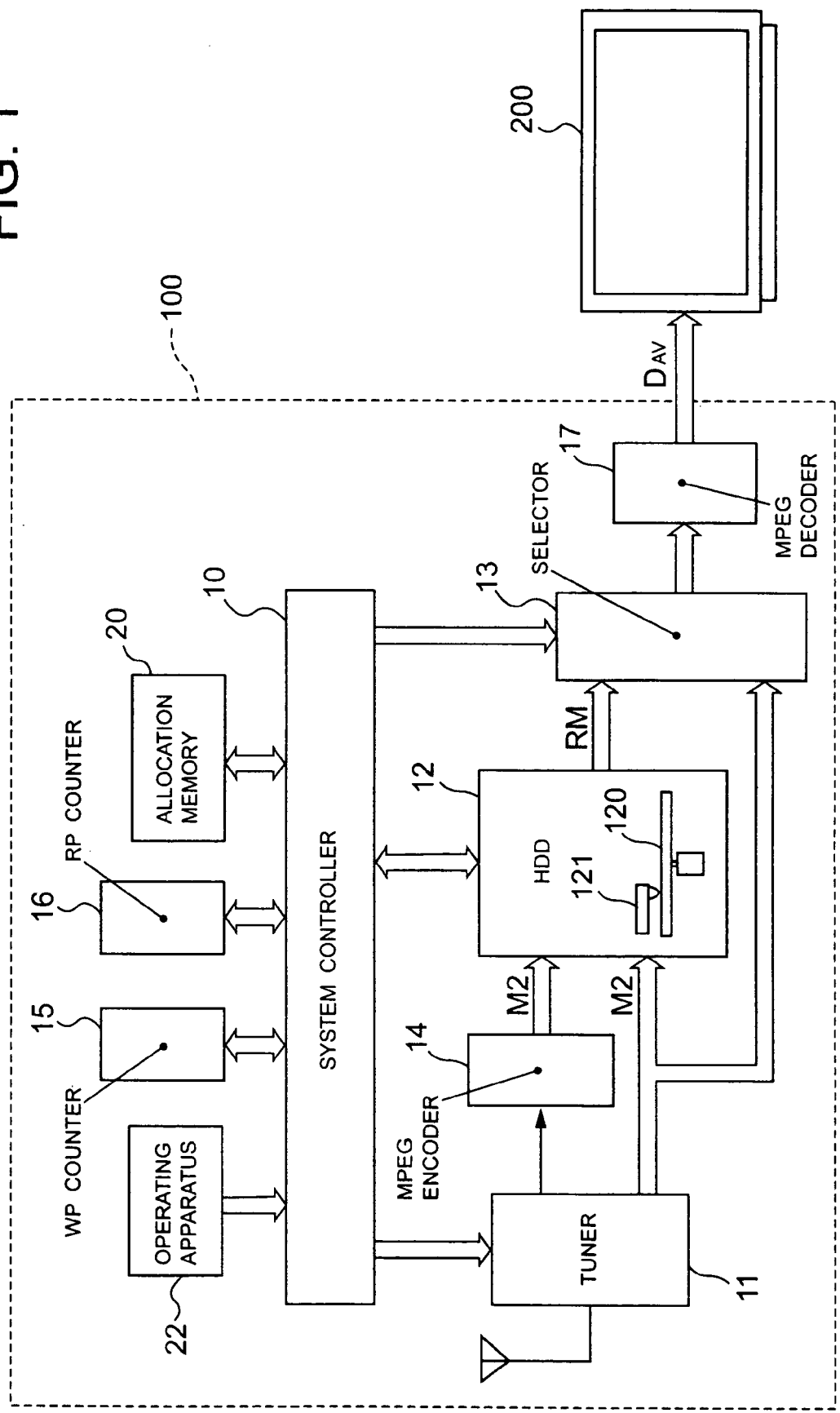
FIG. 1 is a diagram showing a construction of an information recording and reproducing apparatus 100 according to the invention.

FIG. 1 is a diagram showing a construction of an information recording and reproducing apparatus 100 according to the invention.

In FIG. 1, when a channel designation signal of digital broadcast is supplied from a system control circuit 10, a tuner 11 receives a digital broadcast wave of the designated channel. The tuner 11 obtains an MPEG (Moving Picture Experts Group) signal by demodulating the received digital broadcast wave and supplies it as an MPEG signal M1 to each of a hard disk drive (HDD) 12 and a selector 13. When the channel designation signal of analog television broadcast (NTSC system, PAL system, or SECAM system) is supplied from the system control circuit 10, the tuner 11 receives an analog television broadcast wave of the designated channel. The tuner 11 supplies the television signal obtained by demodulating the received analog television broadcast wave to an MPEG encoder 14. The MPEG encoder 14 supplies the signal obtained by performing an MPEG encoding process to the television signal as an MPEG signal M2 to the HDD 12.

Figure 2:
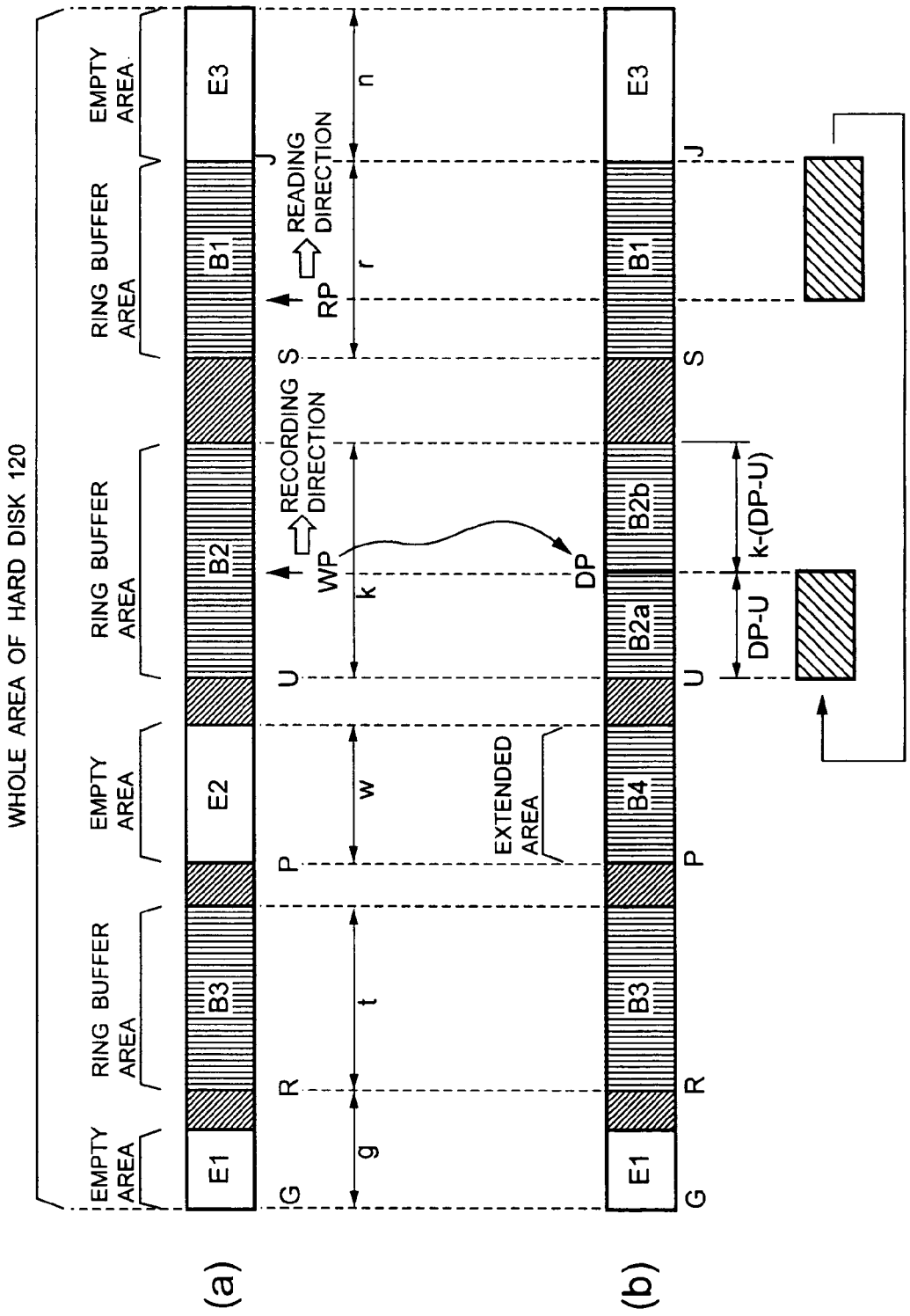
FIG. 2 is a diagram showing an example of forms of ring buffer areas and empty areas in a hard disk 120.

A recording and reproducing head 121 of the HDD 12 records the MPEG signal M1 or M2 into a ring buffer area on a hard disk 120 as shown in a portion (a) in FIG. 2 in response to a recording command signal supplied from the system control circuit 10. The system control circuit 10 retrieves a count value of a write position counter 15 as a write position WP and supplies it to the HDD 12 as a write address for designating a recording position in the ring buffer area. That is, the recording and reproducing head 121 records the MPEG signal M1 or M2 to a position shown by the write position WP in the hard disk 120. The write position counter 15 starts the count-up operation in response to a count start command from the system control circuit 10. During this period of time, when the write position WP is supplied from the system control circuit 10, the write position counter 15 retrieves it and continues the count-up operation from the retrieved value.

In response to a read command signal supplied from the system control circuit 10, the recording and reproducing head 121 reads out the MPEG signal recorded in the ring buffer area on the hard disk 120 as shown in the portion (a) in FIG. 2 and supplies it as a reproduction MPEG signal RM to the selector 13. The system control circuit 10 extracts a count value of a read position counter 16 as a read position RP and supplies it to the HDD 12 as a read address for designating a reading position in the ring buffer area. That is, the recording and reproducing head 121 of the HDD 12 reads out the MPEG signal from a position shown by the read position RP in the ring buffer area on the hard disk 120. The read position counter 16 starts the count-up operation in response to the count start command from the system control circuit 10. During this period of time, when the read position RP is supplied from the system control circuit 10, the read position counter 16 retrieves it and continues the count-up operation from the retrieved value.

Between the reproduction MPEG signal RM supplied from the HDD 12 and the MPEG signal M1 supplied from the tuner 11, the selector 13 alternatively selects the signal according to a selection signal supplied from the system control circuit 10 and transmits it to an MPEG decoder 17. The MPEG decoder 17 executes an MPEG decoding process to the MPEG signal supplied from the selector 13, thereby obtaining an audio/video data signal and supplying it as audio/video data signal $D_{AV}$ to a display device 200. The display device 200 displays an image on the basis of the audio/video data signal $D_{AV}$ supplied from the information recording and reproducing apparatus 100.

An allocation descriptor showing an existing position of each of a plurality of divided areas constructing the ring buffer area in the hard disk 120 has been stored in an allocation memory 20. For example, assuming that the ring buffer area has been divided into a first divided area B1, a second divided area B2, and a third divided area B3 as shown in the portion (a) in FIG. 2, the allocation descriptors as shown in FIG. 3A are stored in the allocation memory 20. That is, a head position S and a recording capacity r of the first divided area B1 to which the recording (or reading) is performed first are stored as a first allocation descriptor (hereinafter, referred to as a first AD) into the allocation memory 20. Further, a head position U and a recording capacity k of the second divided area B2 to which the recording (or reading) is performed subsequently to the first divided area B1 are stored as a second allocation descriptor (hereinafter, referred to as a second AD) into the allocation memory 20. A head position R and a recording capacity t of the third divided area B3 to which the recording (or reading) is performed subsequently to the second divided area B2 are stored as a third allocation descriptor (hereinafter, referred to as a third AD) into the allocation memory 20.

Further, an allocation descriptor showing an existing position of each of empty areas existing at present in the hard disk 120 has been stored in an allocation memory 20. For example, when empty areas E1 to E3 as shown in the portion (a) in FIG. 2 exist in the hard disk 120, allocation descriptors as shown in FIG. 4A are stored in the allocation memory 20. That is, a head position G and a recording capacity g of the empty area E1 shown in the portion (a) in FIG. 2 have been stored as a first AD into the allocation memory 20. A head position P and a recording capacity w of the empty area E2 have been stored as a second AD into the allocation memory 20. A head position J and a recording capacity n of the empty area E3 have been stored as a third AD into the allocation memory 20. As shown in FIGS. 3A, 3B, 4A, and 4B, the head position of each area is referred to as an extent location and the recording capacity of each area is referred to as an extent length.

An operating device 22 receives various operations from the user and transmits an operation command signal according to the operation to the system control circuit 10. A remote controller which is separately provided from a casing of the information recording and reproducing apparatus 100 can be also used as an operating device 22.

Each of the operations (television monitoring, continuous recording simultaneous reproduction, ring buffer area expatension) of the information recording and reproducing apparatus 100 with the construction as mentioned above will be explained.

(1) Television Monitor

When monitoring the program during the broadcast in a real-time manner, the user executes the designating operation of a desired channel by using the operating device 22. In accordance with this operation, the operating device 22 supplies a television monitor command signal to the system control circuit 10. In response to the TV monitor command signal, the system control circuit 10 supplies a channel designation signal for allowing the broadcast program of the desired channel to be received to the tuner 11. At the same time, the system control circuit 10 supplies a selection signal for alternatively transferring the MPEG signal M1 generated from the tuner 11 to the MPEG decoder 17 to the selector 13.

By the control as mentioned above, the MPEG signal M1 obtained by receiving and demodulating by the tuner 11 is decoded to the audio/video data signal $D_{AV}$ by the MPEG decoder 17 and, thereafter, supplied to the display device 200. The display device 200, thus, displays the digital broadcast program of the desired channel received by the tuner 11 as an image in a real-time manner.

(2) Continuous Recording Simultaneous Reproduction

When continuously recording each program broadcasted by the desired channel, the user executes the continuous recording command operation by using the operating device 22. In accordance with the continuous recording command operation, the operating device 22 supplies a continuous recording command signal to the system control circuit 10. In response to the continuous recording command signal, the system control circuit 10 first extracts the allocation descriptor showing the position in the ring buffer area to be first recorded, that is, the first AD shown in FIG. 3A from the allocation memory 20. The system control circuit 10 supplies the extent location shown in the first AD, that is, the head position S of the first divided area B1 shown in the portion (a) in FIG. 2, as a write position WP to the write position counter 15. The write position counter 15 retrieves the write position WP and starts the count-up operation from the retrieved value, that is, the value of the head position S. During this period of time, the system control circuit 10 supplies a recording command signal to the HDD 12 and supplies a present count value (write position WP) of the write position counter 15 as a write address to the HDD 12. The recording and reproducing head 121 of the HDD 12, thus, sequentially records the MPEG signal M1 (or M2) obtained by receiving and demodulating by the tuner 11 from the head position S of the first divided area BI in the ring buffer area on the hard disk 120 as shown in the portion (a) in FIG. 2.

During this period of time, the system control circuit 10 discriminates whether the count value at the present point of time of the write position counter 15 is equal to the value obtained by adding the extent location and extent length shown in the first AD, that is, the value indicative of the last position of the first divided area B1 or not. That is, whether the recording of the data in a range from the head position S of the first divided area B1 to the last position has been completed or not is discriminated. If it is determined that the recording in the range from the head position S of the first divided area B1 to the last position has been completed, the system control circuit 10 retrieves the second AD as shown in FIG. 3A from the allocation memory 20. That is, upon completion of the recording in the first divided area B1, the second AD in which the position of the second divided area B2 as a next recording target is shown is fetched. The system control circuit 10 supplies the extent location shown in the second AD, that is, the head position U of the second divided area B2 as shown in the portion (a) in FIG. 2 as a write position WP to the write position counter 15. The write position counter 15 retrieves the write position WP and starts the count-up operation from the retrieved value, that is, the value of the head position U. During this period of time, the system control circuit 10 supplies the recording command signal to the HDD 12 and supplies the present count value (write position WP) of the write position counter 15 as a write address to the HDD 12. The recording and reproducing head 121 of the HDD 12, thus, sequentially records the MPEG signal M1 (or M2) obtained by receiving and demodulating by the tuner 11 from the head position U of the second divided area B2 in the ring buffer area on the hard disk 120 as shown in the portion (a) in FIG. 2.

That is, when the recording of the whole first divided area B1 as shown in the portion (a) in FIG. 2 is finished, the program is subsequently recorded from the head position of the second divided area B2. During this period of time, the system control circuit 10 discriminates whether the count value at the present point of time of the write position counter 15 is equal to the value obtained by adding the extent location and extent length shown in the second AD, that is, the value indicative of the last position of the second divided area B2 or not. That is, whether the recording of the data in a range from the head position U of the second divided area B2 to the last position has been completed or not is discriminated. If it is determined that the recording in the range from the head position of the second divided area B2 to the last position has been completed, the system control circuit 10 retrieves the third AD as shown in FIG. 3A from the allocation memory 20. That is, upon completion of the recording in the second divided area B2, the third AD in which the position of the area as a next recording target is shown is fetched. The system control circuit 10 supplies the extent location shown in the third AD, that is, the head position R of the third divided area B3 as shown in the portion (a) in FIG. 2 as a write position WP to the write position counter 15. The write position counter 15 retrieves the write position WP and starts the count-up operation from the retrieved value, that is, the value of the head position R. During this period of time, the system control circuit 10 supplies the recording command signal to the HDD 12 and supplies the present count value (write position WP) of the write position counter 15 as a write address to the HDD 12. Subsequently, the recording and reproducing head 121 of the HDD 12, thus, sequentially records the MPEG signal M1 (or M2) obtained by receiving and demodulating by the tuner 11 from the head position R of the third divided area B3 in the ring buffer area on the hard disk 120 as shown in the portion (a) in FIG. 2.

Figure 5A:
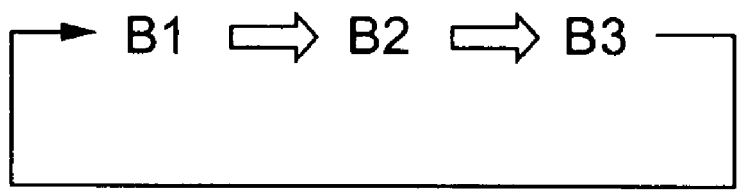
FIGS. 5A and 5B are diagrams showing examples of a recording or reproducing procedure of each divided area.

That is, when the recording operations are finished in the order of the first divided area B1 and second divided area B2 as shown in the portion (a) in FIG. 2, the program is subsequently recorded from the head position R of the third divided area B3. During this period of time, the system control circuit 10 discriminates whether the count value at the present point of time of the write position counter 15 is equal to the value obtained by adding the extent location and extent length shown in the third AD, that is, the value indicative of the last position of the third divided area B3 or not. That is, whether the recording of the data in a range from the head position R of the third divided area B3 to the last position has been completed or not is discriminated. If it is determined that the recording in the range from the head position of the third divided area B3 to the last position has been completed, the system control circuit 10 retrieves the fourth AD in which the position of the area as a next recording target is shown from the allocation memory 20. As shown in FIG. 3A, however, since the fourth AD is not stored in the allocation memory 20, the system control circuit 10 again retrieves the first AD from the allocation memory 20 and repetitively executes the operations as mentioned above. That is, upon completion of the recording of the whole third divided area B3, the recording position returns to the head position of the first divided area B1 as shown in FIG. 5A and executes the circulative recording in the ring buffer in the order of the first divided area B1, second divided area B2, and third divided area B3.

When reproducing the desired recorded program during the recording operation, the user executes the designation of the desired program and the reproducing command operation by using the operating device 22. In accordance with this operation, the operating device 22 supplies a reproducing command signal to the system control circuit 10. In response to the reproducing command signal, the system control circuit 10 supplies the read position RP indicative of the head position of the desired program designated by the user and the count start command to the read position counter 16. The read position counter 16, thus, retrieves the read position RP as its initial count value and starts the count-up operation from the retrieved value. Further, the system control circuit 10 supplies the reproducing command signal to the HDD 12 and supplies the present count value (read position RP) of the read position counter 16 as a read address to the HDD 12. The recording and reproducing head 121 of the HDD 12, thus, reads out the information from the position in the ring buffer area shown by the read position RP and supplies the obtained reproduction MPEG signal RM to the selector 13. The system control circuit 10 supplies a selection signal for alternatively transferring the reproduction MPEG signal RM generated from the hard disk 12 to the MPEG decoder 17 to the selector 13. By the operation as mentioned above, the audio/video data signal $D_{AV}$ corresponding to the desired program designated by the user is supplied to the display device 200. The reproduction display of the desired program is started by the display device 200.

During this period of time, the system control circuit 10 discriminates the count value (read point RP) at the present point of time of the read position counter 16 is equal to the value showing the last position of the area (for example, the first divided area B1, second divided area B2, or third divided area B3) which is at present being reproduced or not. If it is determined that they are identical, the system control circuit 10 reads out the allocation descriptor indicative of the existing position of the area as a next reproduction target of the area from the allocation memory 20. For example, if the area which is at present being reproduced is the first divided area B1 shown in the portion (a) in FIG. 2, the system control circuit 10 reads out the second AD indicative of the existing position of the second divided area B2 where the reproduction should be executed next of that area from the allocation memory 20. The system control circuit 10 supplies the head position U of the second divided area B2 shown by the second AD as shown in FIG. 3A as a new read point RP to the read position counter 16. The read position counter 16, thus, retrieves the head position U as an initial count value and starts the count-up operation from the retrieved value. The system control circuit 10 supplies the reproducing command signal to the HDD 12 and supplies the present count value (read position RP) of the read position counter 16 as a read address to the HDD 12. The recording and reproducing head 121 of the HDD 12, thus, sequentially reads the information from the head position U of the second divided area B2 and supplies the obtained reproduction MPEG signal RM to the selector 13. That is, when the reproduction up to the last position of the first divided area B1 is finished, the recording and reproducing head 121 subsequently starts the reproduction from the head position U of the second divided area B2.

During this period of time, the system control circuit 10 discriminates whether the count value at the present point of time of the read position counter 16 is equal to the value obtained by adding the extent location and the extent length shown in the second AD, that is, a value showing the last position of the second divided area B2 or not. That is, whether the reproduction in a range from the head position U of the second divided area B2 to the last position has been completed or not is discriminated. If it is determined that the reproduction in the range from the head position of the second divided area B2 to the last position has been completed, the system control circuit 10 retrieves the third AD shown in FIG. 3A from the allocation memory 20. That is, when the reproduction in the second divided area B2 is finished, the third AD in which the position of the third divided area B3 as a next reproduction target is shown is fetched. The system control circuit 10 supplies the extent location shown in the third AD, that is, the head position R of the third divided area B3 as shown in the portion (a) in FIG. 2 as a read position RP to the read position counter 16. The read position counter 16 retrieves the read position RP and starts the count-up operation from the retrieved value, that is, from the value of the head position R. During this period of time, the system control circuit 10 supplies the reproducing command signal to the HDD 12 and also supplies the present count value (read position RP) of the read position counter 16 as a read address to the HDD 12. The recording and reproducing head 121 of the HDD 12, thus, sequentially reads the information from the head position R of the third divided area B3 and supplies the obtained reproduction MPEG signal RM to the selector 13. That is, when the reproduction up to the last position of the second divided area B2 is finished, the recording and reproducing head 121 subsequently starts the reproduction from the head position R of the third divided area B3.

During this period of time, the system control circuit 10 discriminates whether the reproduction in a range from the head position U of the third divided area B3 to the last position has been completed or not on the basis of the count value (read position RP) at the present point of time of the read position counter 16. If it is determined that the reproduction in the range from the head position of the third divided area B3 to the last position has been completed, the system control circuit 10 retrieves the fourth AD in which the position of the area as a next reproduction target is shown from the allocation memory 20. Since the fourth AD is not stored in the allocation memory 20 as shown in FIG. 3A, however, the system control circuit 10 retrieves the first AD from the allocation memory 20 again and repetitively executes the operations as mentioned above. That is, when the whole reproduction from the third divided area B3 is finished, as shown in FIG. 5A, the reproducing position returns to the head position of the first divided area B1 and the reproduction is executed in the order of the first divided area B1, second divided area B2, and third divided area B3, so that the reproduction position circulates in the ring buffer area. The reproducing operation finishes at the point when the whole reproduction of the desired program is completed.

As mentioned above, the information recording and reproducing apparatus 100 respectively, independently, and simultaneously executes the circulated recording and reproduction as shown in FIG. 5A in the ring buffer area.

(3) Ring Buffer Area Extension

When extending the ring buffer area, the user executes the continuous recording time extension command operation by using the operating device 22. In accordance with the continuous recording time extension command operation, the operating device 22 supplies a ring buffer area extension command signal to the system control circuit 10. In response to the ring buffer area extension command signal, the system control circuit 10 executes a control according to a ring buffer area expanding routine as shown in FIG. 6.

Figure 6:
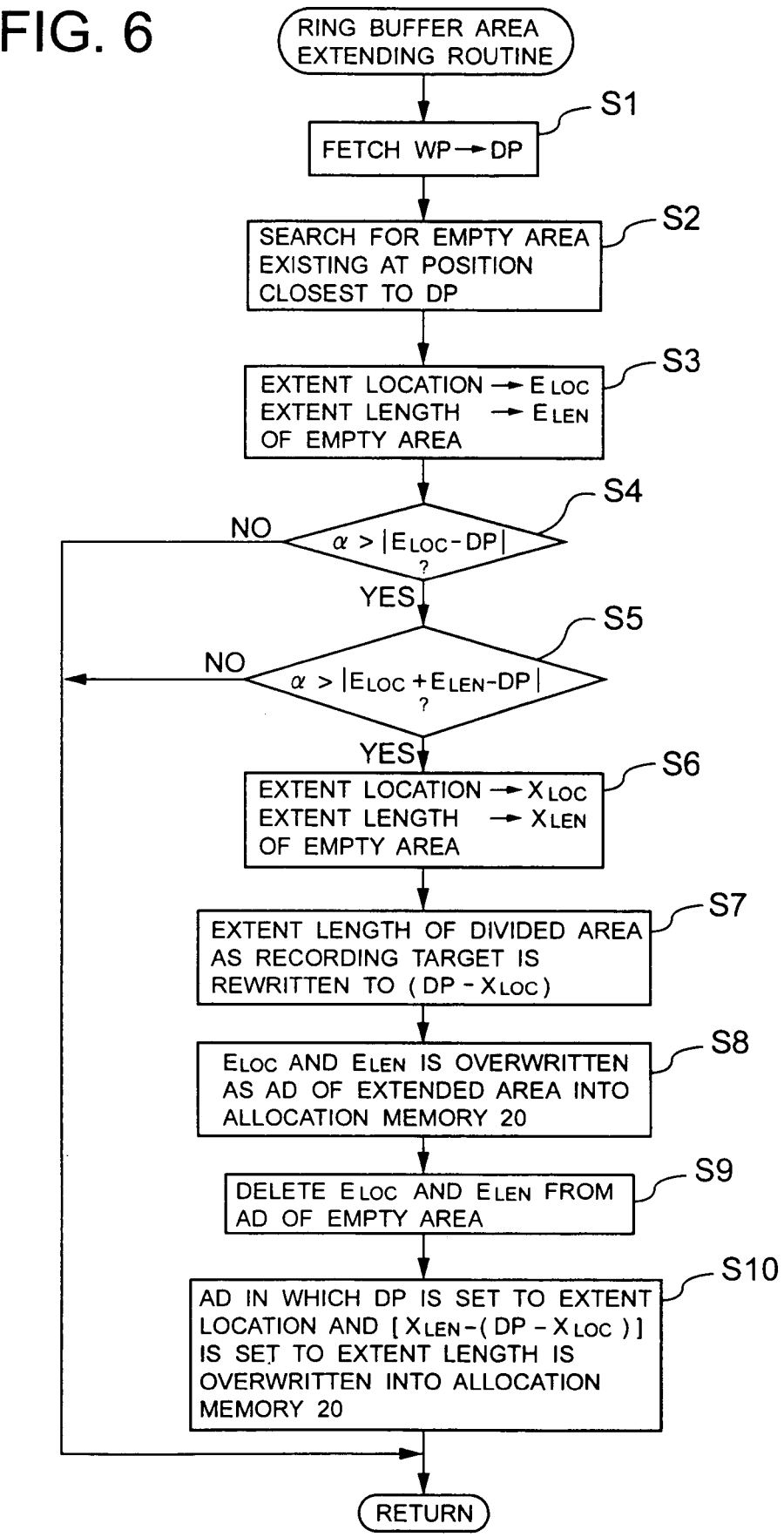
FIG. 6 is a diagram showing a ring buffer area expanding routine.

In FIG. 6, the system control circuit 10 first retrieves the count value (write position WP) of the write position counter 15 showing the recording position at the present point of time and stores it as an extension start point DP into a built-in register (not shown) (step S1). Subsequently, the system control circuit 10 searches for an empty area existing at the position closest to the extension start point DP on the basis of an allocation descriptor of the empty area stored in the allocation memory 20 as shown in FIG. 4A (step S2). That is, the system control circuit 10 searches for a candidate which is to be used as an extended area in the ring buffer area from the empty areas existing on the hard disk 120. Subsequently, the system control circuit 10 stores the extent location of the searched out empty area as $E_{LOC}$ and stores the extent length as $E_{LEN}$ into the built-in register, respectively (step S3).

For example, if the write position WP showing the recording position at the resent point of time exists in the second divided area B2 as shown in the portion (a) in FIG. 2, the empty area existing at the position nearest to the write position WP (=extension start point DP) is the empty area E2. That is. the empty area E2 is searched out as a candidate for the extended area. In this process, the system control circuit 10 sets the extent location "P" of the empty area E2 as shown in FIG. 4A to $E_{LOC}$ and sets the extent length "w" to $E_{LEN}$.

After the execution of step S3, the system control circuit 10 discriminates whether an absolute value of a difference between the extent location $E_{LOC}$ and the extension start point DP is smaller than a predetermined value α or not (step S4). The predetermined value a is the maximum value such that even when the recording and reproducing head 121 of the HDD 12 jumps by a distance indicated by the predetermined value α in order to change the recording position on the hard disk 120, the audio/video data signal $D_{AV}$ can be continuously supplied to the display device 200 without being interrupted. That is, whether the reproduced image display on the display device 200 is interrupted when the recording and reproducing head 121 jumps to the head position of the empty area serving as a candidate for the extended area or not is discriminated in step S4. In step S4, if it is determined that the absolute value of the difference between the extent location $E_{LOC}$ and the extension start point DP is larger than the predetermined value α, that is, if it Is decided that the interruption of the reproduced image display occurs, the system control circuit 10 exits from the ring buffer area expanding routine and returns to the execution of the main routine (not described).

In step S4, if It is determined that the absolute value of the difference between the $E_{LOC}$ and the DP is smaller than the predetermined value α, that is, if it is decided that the interruption of the reproduced image display does not occur even if the recording and reproducing head 121 jumps to the head position of the empty area serving as a candidate for the extended area. the system control circuit 10 executes next step S5.

The system control circuit 10 discriminates whether an absolute value of a difference between the addition value of the extent location $E_{LOC}$ and the extent length $E_{LEN}$ and the extension start point DP is smaller than the predetermined value α or not (step S5). By step S5, a check is made to see if the reproduced image display on the display device 200 is interrupted while the recording and reproducing head 121 jumps from the last position ($E_{LOC}+E_{LEN}$) of the empty area serving as a candidate for the extended area and returned to the extension start point DP. In step S5, if it is determined that the absolute value of the difference between the addition value of $E_{LOC}$ and $E_{LEN}$ and the DP is larger than the predetermined value α, that is, if it is decided that the interruption of the reproduced image display occurs, the system control circuit 10 exits from the ring buffer area expanding routine and returns to the execution of the main routine (not described).

In step S5, if it is determined that the absolute value of the difference between the addition value of $E_{LOC}$ and $E_{LEN}$ and the DP is smaller than the predetermined value α, the system control circuit 10 executes step S6. That is, If it is judged that even if the recording and reproducing head 121 jumps from the last position of the empty area serving as a candidate for the extended area to the position of DP, the interruption of the reproduced image display does not occur during that period of time, the system control circuit 10 executes next step S6.

The system control circuit 10 reads out the allocation descriptor of the divided area serving as a recording target at present from the allocation memory 20 and stores the extent location as $X_{LOC}$ and stores the extent length as $X_{LEN}$ into the built-in register, respectively (step S6). Subsequently, the system control circuit 10 rewrites the extent length of the allocation descriptor of the divided area serving as a recording target at present by the value obtained by subtracting the $X_{LOC}$ from the extension start point DP (step S7). That is, among the allocation descriptors of the divided areas stored in the allocation memory 20 as shown in FIG. 4A, the system control circuit rewrites only the extent length of the allocation descriptor of the divided area serving as a recording target at present to a value (DP-$X_{LOC}$).

For example, if the divided area serving as a recording target at present is the second divided area B2 as shown in the portion (a) in FIG. 2, the extent location "U" of the second divided area B2 is set to $X_{LOC}$ and the extent length "k" is set to $X_{LEN}$ The extent length "k" of the second divided area B2 as shown in FIG. 3A is, therefore, rewritten to "(DP-U)" as shown in FIG. 3B. The second divided area B2, thus, becomes a new second divided area B2a whose recording capacity is reduced from "k" to "(DP-U)" as shown in a portion (b) in FIG. 2.

After the execution of step S7, the system control circuit 10 additionally stores the extent location $E_{LOC}$ and extent length $E_{LEN}$ into the allocation memory 20 as an allocation descriptor of the extended area to be set to the recording (or reproducing) target next of the divided area serving as a recording target at present (step S8).

For example, if the empty area serving as a candidate for the extended area searched out in step S2 is the empty area E2 shown in the portion (a) in FIG. 2, the extent location "P" of the empty area E2 is set to $E_{LOC}$ and the extent length "w" is set to $E_{LEN}$. In this process, the allocation descriptor defined by the extent location "P" and the extent length "w" showing the extended area is additionally stored as a third AD into the allocation memory 20 as shown in FIG. 3B.

After the execution of step S8, among the allocation descriptors of the empty areas stored in the allocation memory 20 as shown in FIG. 4A, the system control circuit 10 deletes the allocation descriptor shown by the $E_{LOC}$ and $E_{LEN}$ (step S9).

For example, if the empty area serving as a candidate for the extended area is the empty area E2 shown in the portion (a) in FIG. 2, the extent location "P" of the empty area E2 and the extent length "w" are deleted from the allocation memory 20. The allocation descriptor regarding the empty area is, thus, shifted from that shown in FIG. 4A to that shown in FIG. 4B. By the execution of steps S8 and S9, therefore, the empty area E2 shown in the portion (a) in FIG. 2 becomes a fourth divided area B4 expanded as a ring buffer area as shown in the portion (b) in FIG. 2.

After the execution of step S9, the system control circuit 10 additionally stores the allocation descriptor in which the extension start point DP is set to the extent location and the value obtained by subtracting (DP-$X_{LOC}$) from the extent length $X_{LEN}$ is set to the extent length into the allocation memory 20 (step S10). That is, by step S10, the allocation descriptor of the area to be the recording (or reproducing) target next of the extended area is obtained and additionally stored into the allocation memory 20. In the divided area serving as a recording target at present, therefore, an area in a range from the position shown by the extension start point DP to the last of the divided area becomes a new divided area to be the recording (or reproducing) target next of the extended area. For example, when the DP is the position as shown in the portion (b) in FIG. 2, the fourth AD in which the DP is set to the extent location and a recording capacity (k-DP+U) in a range from the DP to the last position of the second divided area B2 is set to the extent length is additionally stored into the allocation memory 20 as shown in FIG. 3B. The area in a range from the position of the extension start point DP to the last position of the second divided area B2, thus, becomes a second divided area B2b to be the recording (or reproducing) target next of the extended area as shown in the portion (b) in FIG. 2.

After the execution of step S10, the system control circuit 10 exits from the ring buffer area expanding routine and returns to the execution of the main routine (not described).

Figure 5B:
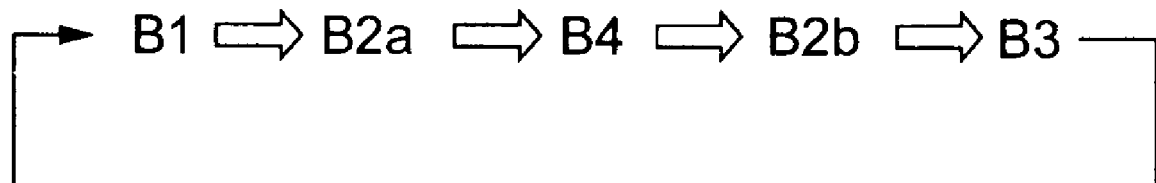

As mentioned above, in the ring buffer area extension control operation, for example, when the write position WP showing the recording position at the present point of time exists in the second divided area B2 in the ring buffer area as shown in the portion (a) in FIG. 2, first, the write position WP is set to the extension start point DP. In this case, in order to divide the second divided area B2 into the area (second divided area B2a) just before the extension start point DP as shown in the portion (b) in FIG. 2 and the area (second divided area B2b) after the DP, the allocation descriptors regarding the ring buffer area stored in the allocation memory 20 are rewritten as shown in FIG. 3B. Further, the empty area E2 existing at the position near the extension start point DP is set to the extended area (fourth divided area B4) as shown in the portion (b) in FIG. 2. The allocation descriptor for setting it to the recording (or reproducing) target next of the second divided area B2a is overwritten into the allocation memory 20 as shown in FIG. 3B. By the allocation descriptor regarding the ring buffer area as shown in FIG. 3B, therefore, the recording and reproducing procedure by which the recording and reproducing head 121 should set the divided areas in the ring buffer area as shown in the portion (b) in FIG. 2 to the recording (or reproducing) targets in an order shown in FIG. 5B is set.

According to this ring buffer area extension control operation, therefore, even during the execution of the continuous recording of the broadcast program, the ring buffer area is expanded in accordance with the continuous recording time extension command operation by the user.

Furthermore, in the ring buffer area extension control operation, the recording and reproducing procedure is set in a manner such that the recording position at the point when the continuous recording time extension command operation is executed is set to the extension start point DP and the recording (or reproduction) to the extended area (B4) is executed subsequently to the recording (or reproduction) to the area (B2a) just before the DP. That is, the extended area is inserted to the (time-dependent) position where the recording is executed from now on. In the range from the read position RP indicative of the information reading position at the present point of time to the extension start point DP as shown in a hatched portion in the portion (b) in FIG. 2, therefore, continuity of the recorded data is guaranteed. While the continuous recording simultaneous reproduction is being executed, therefore, even if the continuous recording time extension command operation is executed by the user, the ring buffer area is expanded without causing a trouble in the reproduced image.

In the embodiment, the write position WP indicative of the recording position at the present point of time is set to the extension start point DP as it is. The continuity of the recorded data is, however, guaranteed so long as the DP lies within a range from the position just after the write position WP to the read position RP. If the DP exists at any position within the range, the extension start point DP can be also obtained by the following equation.

DP=(write position WP+predetermined value β)

Although the hard disk of the magnetic recording type has been used as a recording medium for recording, the broadcast program in the embodiment, a detachable recording medium such as an optical recording medium can be also used.

Although the information recording and reproducing apparatus 100 for recording and reproducing the video signal as a target has been described in the embodiment, the information recording and reproducing apparatus can also record and reproduce only an audio signal as a target.

Further, although the embodiment has been constructed so that the empty area existing near the extension start point DP is searched for in accordance with the extension command operation, the empty area searching operation is unnecessary in the case of using the following method. That is, for example, the operating device 22 is provided with: a memory area designating key for storing and designating (overwriting is inhibited) a part of the video signal recorded in the ring buffer area; and a deleting key for deleting the video signal designated by the memory area designating key. The empty area formed by deleting the video signal whose storage has been designated by the deleting key operation is directly set to the extended area in the ring buffer area. The deleting key operation becomes a trigger at the time when the extension command signal according to the invention is generated.

In the embodiment, although each of the write position WP and read position RP has been obtained by the count value of each of the write position counter 15 and read position counter 16, the invention is not limited to the construction mentioned above. For example, a write position register is provided in place of the write position counter 15 and a read position register is provided in place of the read position counter 16. The system control circuit 10 successively obtains the recording position and reproducing position at the present point of time of the recording and reproducing head 121. While the obtained recording position is successively overwritten as a write position WP into the write position register, the system control circuit 10 successively overwrites the obtained reproducing position as a read position RP into the read position register.

According to the invention as described in detail above, the ring buffer area can be extended even at the time of the continuous recording simultaneous reproduction without causing a trouble in the reproduced image.

This application is based on Japanese Patent Application No. 2000-369949 which is herein incorporated by reference.

What is claimed is:

1. An information recording and reproducing apparatus, comprising:
   a recording unit which records an information signal in a-predetermined area on a recording medium;
   an operating part which generates an extension command signal in accordance with an extension command operation;
   an extension start point obtaining unit which obtains an extension start point based on said extension command signal; and
   a recording procedure setting part which sets an empty area on said recording medium as an extended area, and sets said extended area as a target of recording said information signal after having finished recording at an area which ends at a position just before said extension start point, and which also sets said extension start point as a target of recording after having finished recording at said extended area so as to return to said extension start point to continue recording said information signal at said extension start point.

2. An apparatus according to claim 1, wherein said extension start point obtaining unit is operative to set a recording position of said predetermined area by said recording unit at an instant of generation of said extension command signal as said extension start point as it is.

3. An apparatus according to claim 1, wherein said extension start point obtaining unit is operative to set an arbitrary position in a range from the recording position in said predetermined area by said recording unit at an instant of generation of said extension command signal to a current reproducing position in said predetermined area by said recording unit as said extension start point.

4. An apparatus according to claim 1, further comprising an empty area detecting part which searches for an empty area on said recording medium in accordance with said extension command signal,
   and wherein said empty area detecting part searches said recording medium for an empty area existing at positions near said extension start point.

5. An apparatus according to claim 1, wherein said recording medium is a hard disk.

6. An apparatus according to claim 1, further comprising:
a discrimination part which discriminates whether an absolute value of a difference between the starting point of said extended area and said extension start point is smaller than a predetermined value or not,
wherein the recording procedure setting part sets the recording procedure based on the result of the discrimination part so that the information signal can be continuously supplied without being interrupted when information is reproduced.

7. An apparatus according to claim 6, wherein the discrimination part discriminates whether an absolute value of a difference between the last position of the extended area and said extension start point is smaller than a predetermined value or not.

* * * * *